United States Patent [19]

Weill

[11] Patent Number: 5,201,353
[45] Date of Patent: Apr. 13, 1993

[54] RECONFIGURABLE DEBARKER HEAD

[76] Inventor: Theodore C. Weill, R.R. #3, Box 161W, Tylertown, Miss. 39667

[21] Appl. No.: 735,425

[22] Filed: Jul. 25, 1991

[51] Int. Cl.$^5$ .............................................. B27G 13/12
[52] U.S. Cl. .............................. 144/236; 144/208 F; 144/237; 144/241; 172/549; 407/31
[58] Field of Search .................. 172/549; 407/31; 144/208 F, 218, 231, 236, 237

[56] References Cited

U.S. PATENT DOCUMENTS

| | | |
|---|---|---|
| 948,820 | 2/1910 | Mosher . |
| 2,197,549 | 4/1940 | Hargrave et al. . |
| 2,558,822 | 7/1951 | Claus . |
| 2,936,659 | 5/1960 | Garberding ............................ 407/31 |
| 2,985,206 | 5/1961 | Letts . |
| 3,005,576 | 10/1961 | Trautmann et al. . |
| 3,766,988 | 10/1923 | Whitesides . |
| 3,986,543 | 10/1976 | Slayton et al. . |
| 5,070,920 | 12/1991 | Morey ................................. 144/237 |

OTHER PUBLICATIONS

Drawing, showing an exploded perspective view of a debarker head with a square shaft. Author: Theodore C. Weill, prior Aug. 1989.

Primary Examiner—W. Donald Bray
Attorney, Agent, or Firm—Price, Heneveld, Cooper, DeWitt & Litton

[57] ABSTRACT

A debarker head for use in a rotary tree debarking machine has a drive shaft with a polygonal cross sectional shape and a plurality of substantially similar cutting elements with mounting apertures corresponding to the drive shaft shape and sized for slip fit engagement of the cutting elements on the drive shaft so that the cutting elements may be mounted to the drive shaft at a number of rotational positions relative to the drive shaft. Further, the cutting elements have a plurality of arms with cutting knives. The number of arms of at least some of the cutting elements is not an integer multiple of the number of sides of the mounting aperture so that a variety of cutting knife arrangements for debarking various species of logs using the same head may be obtained by adjusting the rotational position of the cutting elements relative to the drive shaft. This design of debarker head can be repaired in the field.

20 Claims, 3 Drawing Sheets

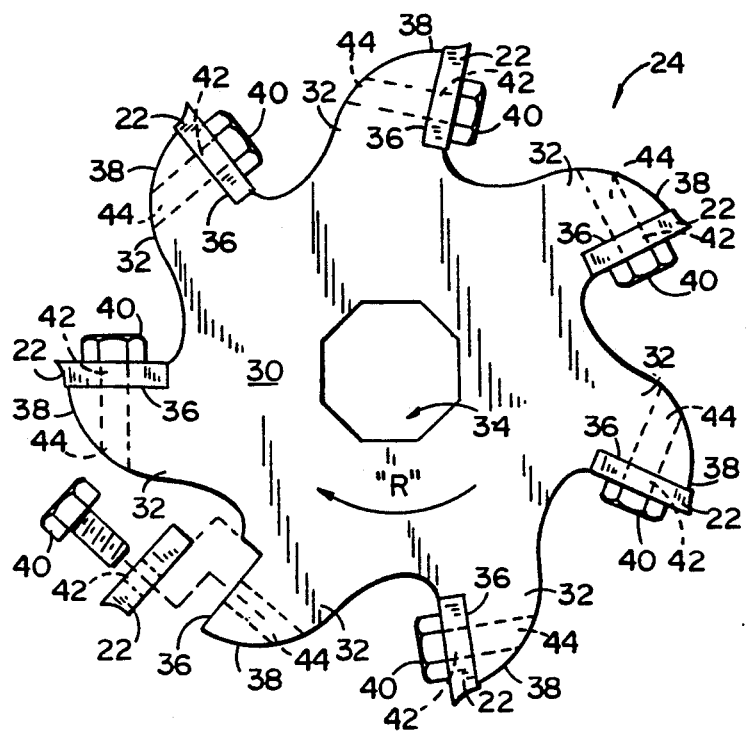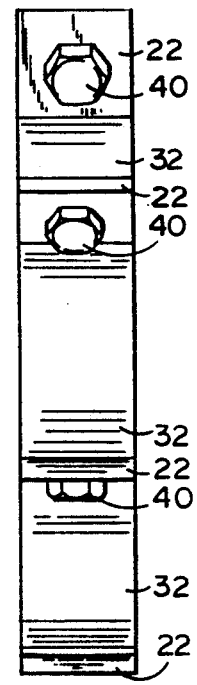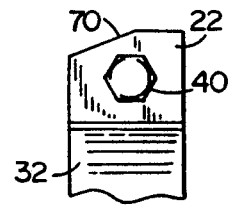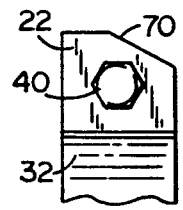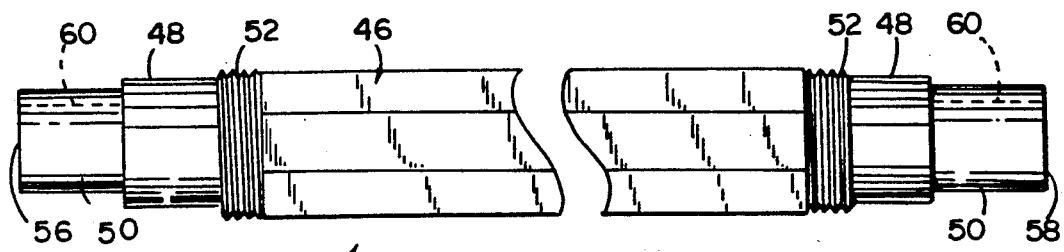

RECONFIGURABLE DEBARKER HEAD

BACKGROUND OF THE INVENTION

The present invention relates to tree debarking devices and specifically to rotary debarker heads.

Wood production typically begins with felling and stripping trees at a logging site. Stripped trees are transported from the forest in large log sections for further processing at a sawmill. The process of stripping a felled tree typically includes removing the bark from the tree which is known as debarking and commonly occurs at the sawmill. A debarking machine having a rotating debarker head is commonly used for the debarking process. Such machines will typically include means for rotating a log under or over a rotating debarker head which travels along the length of the log for removing the bark in preparation for further processing. Such debarking machines will typically have an array of cutting knives, arranged for cutting and chipping bark from the log. The specific arrangement of the cutting knives affects the effectiveness of the debarking process for any given species of log. The most effective arrangement of cutting knives for a hard wood, for example, is different than that for a soft wood. However, a logging site will frequently have only one type of debarker. Thus, the wood processing industry is, as a general rule, faced with the problem of effectively debarking many different species of logs with only one type of debarker.

Debarker heads which are commercially available, commonly use complicated constructions, requiring many parts, including close fitting keyed drive shafts, assembly bolts to hold stacks of cutting elements together on the drive shaft, and set screws to tighten the cutting elements to the drive shaft. A debarker head is subjected to severe torque shock loading, frequently resulting in damaged shaft keyways, keys, and cutting elements. The clamping bolts which hold the cutting elements together and the set screws also sustain frequent damage. Further, the conditions under which debarkers are used subjects the equipment to rust and the components of the debarker head often become fused together. Thus, significant maintenance and repair are often required at the logging site.

The structural arrangement of common heads adds to the difficulty and expense of operating and maintaining a debarking device in the field. Such a debarker head will typically have six to eight cutting elements, each having four to seven wings, stacked on a drive shaft. Each cutting element will have a specific order in the stack, relative to the other cutting elements. Each cutting element will also be keyed relative to the other cutting elements and/or keyed to the drive shaft for a specific rotational position relative to the drive shaft and the other cutting elements. Thus, each cutting element cannot be interchanged with the other cutting elements comprising the debarker head.

Because of this uniqueness of each cutting element, many spare parts must be maintained at the logging site for proper repair and maintenance of the debarker head. In most cases, these heads cannot be repaired in the field. As a practical result, a complete spare debarker head must be available at the site in order to minimize maintenance and repair down time. Conversely, debarking must be suspended while a replacement part is ordered, fabricated and delivered. A third alternative would be to provide the logging site with complete, on demand refabrication facilities. However, each of these alternatives is expensive.

SUMMARY OF THE INVENTION

The present invention addresses the above problems with a debarker head having a plurality of substantially similar cutting elements, having polygonal shaped mounting apertures, for use with a drive shaft having a cutting element mounting area with a corresponding polygonal shaped cross section. Each cutting element may be mounted to the drive shaft in a number of rotational positions relative to the drive shaft, according to the number of sides of the polygonal cross section. Each cutting element also has a plurality of radially extending arms with cutting knives fastened to the arms and extending radially beyond the ends of the arms. Preferably the number of arms is related to the number of sides of the mounting aperture polygonal shape such that the number of arms is not an integer multiple of the number of sides of the mounting aperture polygonal shape. As a result the cutting elements may be rotated relative to the drive shaft and each other for positioning the cutting knives in a variety of arrangements, appropriate for debarking different species of logs. Further, each cutting element may be interchanged with any other cutting element with regard to relative stack position among the cutting elements. Thus, a single debarker head may be arranged to best debark various species of logs and fewer spare parts are required for proper maintenance and repair of the debarker head. In one aspect of the invention, the cutting knives are removably fastened to the arms of the cutting elements for further ease and convenience in maintaining the debarker head. In another aspect of the invention, the drive shaft is symmetric end to end to optimize utility.

These and other objects, advantages and features of the present invention will become apparent upon review of the following specification in conjunction with the drawings.

BRIEF DESCRIPTION OF THE DRAWINGS

FIG. 2 is a partly exploded side elevational view of a cutting element of the debarker head of FIG. 1;

FIG. 3 is a right side elevational view of the cutting element of FIG. 2;

FIG. 4 is a fragmentary enlarged detail view of the cutting element of FIG. 3, showing an alternative embodiment of a cutting knife;

FIG. 5 is a fragmentary enlarged detail view of the cutting element of FIG. 3, showing a second alternative embodiment of a cutting knife;

FIG. 6 is an enlarged front elevational view, partly broken away, of a drive shaft for the debarker head of FIG. 1;

DESCRIPTION OF THE PREFERRED EMBODIMENT

Figure 1:
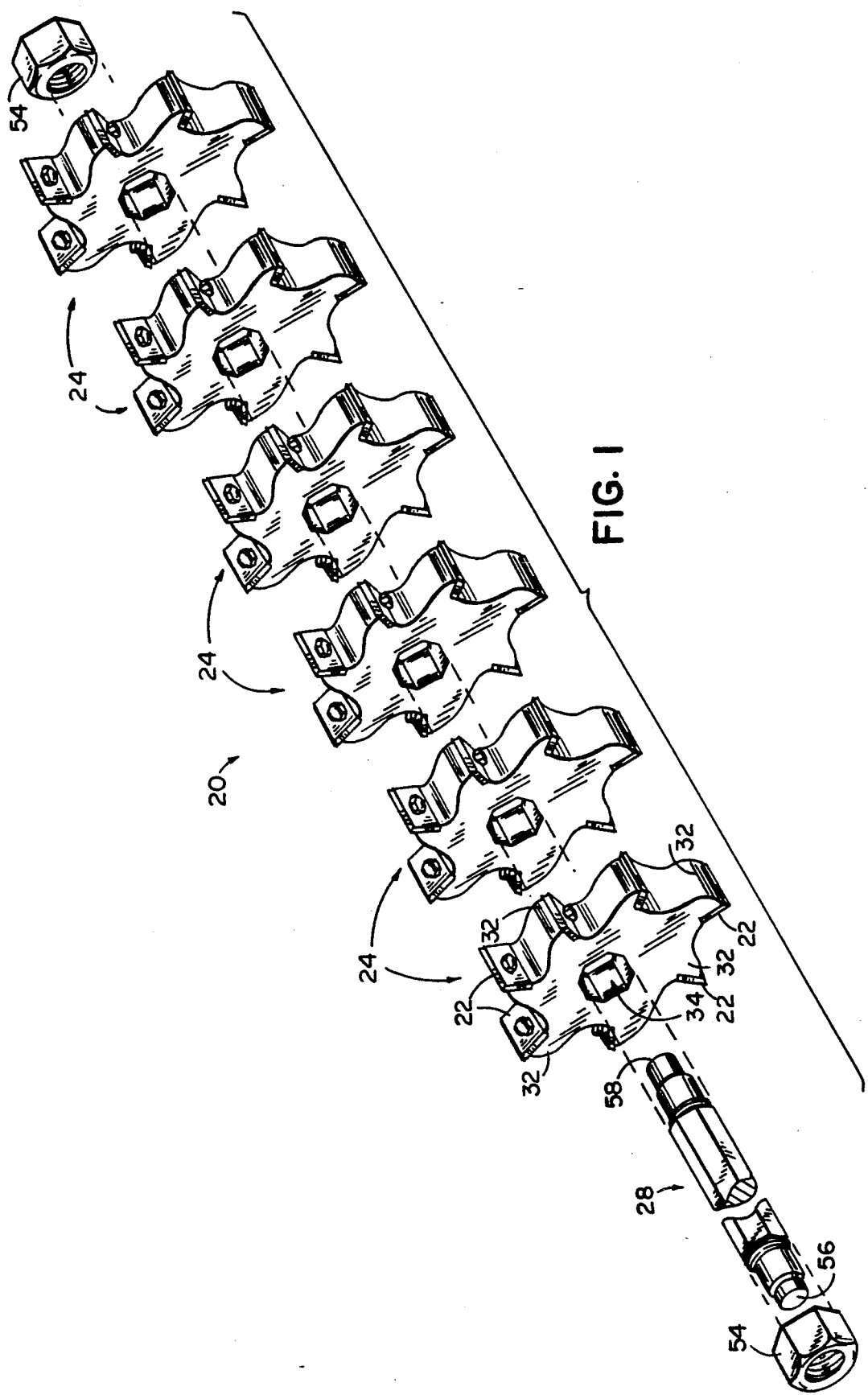
FIG. 1 is an exploded perspective view of a debarker head according to the present invention.

A rotary debarker head 20 for a debarker constructed according to the present invention is shown in FIGS. 1-10. Debarker head 20 has a plurality of cutting elements 24 with each including a plurality of spaced cutting knives 22 spaced around the periphery at equally spaced intervals. Each element is slip fit mounted to a drive shaft 28 (FIGS. 1, 6 and 7-10).

Debarker head 20 preferably has six or eight cutting elements 24 each of which is generally disc shaped with a center body portion 30 and a plurality of arms 32 extending radially outward from body portion 30. The number of arms 32 may vary, depending upon the particular application, but is preferably from 4 to 7. Arms 32 are integrally formed with body portion 30 in a single piece. In the embodiment shown, arms 32 and body portion 30 form a seven wing element 24. Element 24 may be malleable iron or cast aluminum alloy with the cutting knives 22 of wear resistant material such as tungsten carbide. A mounting aperture 34 is generally centered in body portion 30 and has a regular polygonal shape, preferably octagonal. In selecting the number of arms 32 and the number of sides of aperture 34, the number of arms 32 is preferably not an integer multiple of the number of sides of aperture 34. This relationship between arms 32 and aperture 34 relates to the arrangement of cutting knives 22 as discussed below. The number of sides of aperture 34 is selected to maximize the number of rotational positions for mounting cutting element 24 on drive shaft 28 without compromising the durability of debarker head 20 by inducing slip between cutting element 24 and drive shaft 28.

When mounted to drive shaft 28, cutting elements 24 will be rotated with drive shaft 28 in a direction indicated by arrow "R" (FIG. 2). Each arm 32 has a leading face 36, relative to the direction of rotation "R". Leading face 36 is a generally planar surface, near the terminal end 38 of arm 32 for receiving a cutting knife 22. Cutting knife 22 is preferably a rectangular piece of carbide steel, having a width to extend across the thickness of arm 22 and a length to extend beyond terminal end 38. Cutting knife 22 is also preferably removably mounted to leading face 36 by a fine threaded bolt 40. A bolt aperture 42 is provided through cutting knife 22 and aligns with a threaded aperture 44 in arm 32 for receiving bolt 40. Aperture 44 is generally centered in leading face 36 and is threaded to receive bolt 40 for holding a cutting knife 22 in place against leading face 36.

Drive shaft 28 has a center cutting element mounting area 46, spanned on opposite sides by lock nut receiving threads 52. Outboard of the threaded sections 52 are bearing journals 48, spanned by keyed drive sheaves 50, as best seen in FIG. 6. Mounting area 46 has a regular polygonal cross section corresponding to that of mounting apertures 34 of each cutting element 24. Mounting area 46 and mounting apertures 34 are cooperatively sized for slip fit engagement. Drive shaft 28 has threads 52 adjacent to opposing ends of mounting area 46 for receiving lock nuts 54 (FIG. 1) which retain cutting elements 26 in position on mounting area 46. Shims (not shown) may extend between the lock nuts 54 and the end ones of the cutting elements 24 as necessary to hold the elements in tight adjacent relationship along shaft 28. Bearing journals 48 are located adjacent threads 52 and opposite the threads from mounting area 46 (FIG. 6). A drive sheave 50 is provided between bearing journal 48 and each drive shaft end 56, 58 for receiving a drive gear to rotate debarker head 20. Each drive sheave 50 includes a keyway 60 to receive a key for keyed alignment and engagement between drive shaft 28 and a drive gear. The order of bearing journals 48, drive sheaves 50, and threads 52 on drive shaft 28 may be rearranged, depending upon the specific application. Further, debarker head 20 may be operated satisfactorily with one drive sheave at only one drive shaft end 56 or 58, although providing a drive sheave 50 at each end 56, 58, as illustrated, enhances the utility of drive shaft 28.

In use, cutting elements 24 may be mounted to drive shaft 28 to provide a variety of cutting knife arrangements by slipping mounting aperture 34 of each cutting element 24 over either end 56, 58 of drive shaft 28, and aligning each mounting aperture 34 with mounting area 46 as desired for each cutting element 26. Lock nuts 54 are threaded over threads 52 to retain cutting elements 26 in position, on mounting area 46. The debarker head 20, so assembled, is ready for installation in a debarking machine as is commonly known.

In the embodiment shown, six cutting elements 24 are assembled in sequential or stacked arrangement on mounting area 46 of shaft 28 to make up debarker head 20. Since each cutting element is preferably identical to every other cutting element, any cutting element 24 may be placed in any of the six relative positions in the stack. Further, the mounting aperture 34 of each cutting element 24 and mounting area 46 each have a regular octagonal cross sectional shape. Thus, each cutting element 24 may be mounted to drive shaft 28 in eight different rotational positions, relative to drive shaft 28. Giving these variances in assembly by relative rotational position and relative order in the stack, over 180 million combinations are possible in assembling debarker head 20 with the cutting elements 24 and drive shaft 28 as illustrated. Four out of the many practically distinct arrangements of debarker head 20 are illustrated in FIGS. 7-10.

Figure 7:
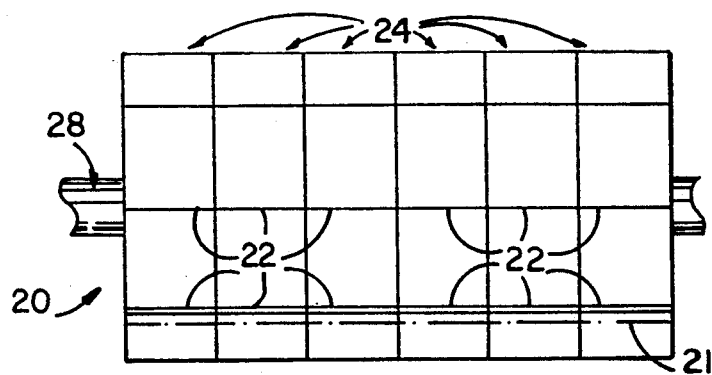
FIG. 7 is a front elevational view of the debarker head of FIG. 1, showing the cutting elements in a first alternative arrangement.

As shown in FIG. 7, cutting elements 24 are aligned in the same relative rotational position with regard to drive shaft 28 so that cutting knives 22 are positioned adjacent each other to form a continuous, straight line cutting edge 21 across debarker head 20.

Figure 8:
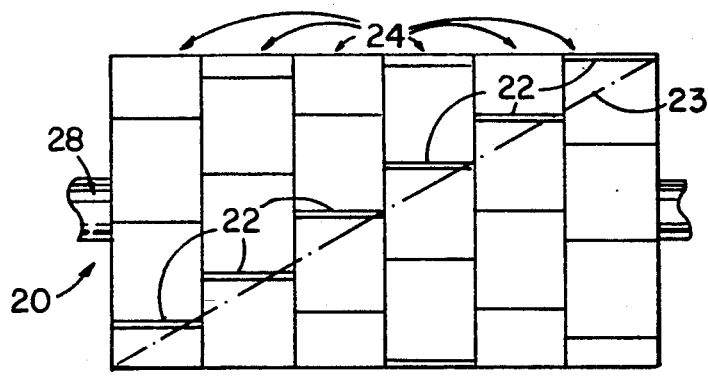
FIG. 8 is a front elevational view of the debarker head of FIG. 1, showing the cutting elements in a second alternative arrangement.
Figure 9:
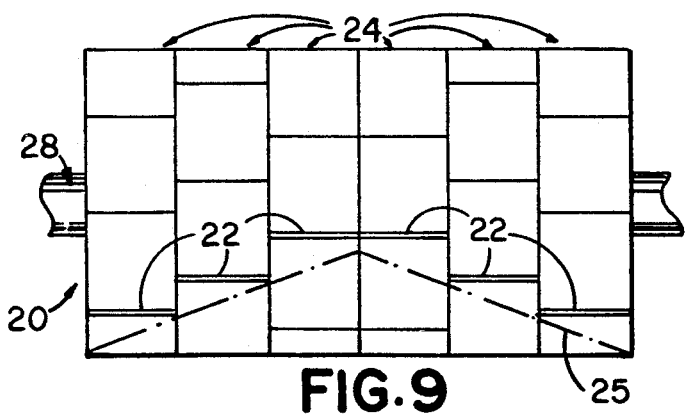
FIG. 9 is a front elevational view of the debarker head of FIG. 1, showing the cutting elements in a third alternative arrangement.

As shown in FIG. 8, cutting elements 24 are rotated in progressively greater degree relative to drive shaft 28 as one proceeds from one end of the stack of cutting elements 24 to the opposing end. In such an arrangement, cutting knives 22 form a spiral cutting pattern about drive shaft 28. This pattern projects to a diagonal line 23 across the stack of cutting elements 26 in the elevational view of FIG. 8. As shown in FIG. 9, the progressive rotation of cutting elements 24, with respect to drive shaft 28, may be reversed half way through the stack of cutting elements 26 to provide a "V" shaped herring bone pattern 25 of cutting knives 22, an inverted "V" pattern may also be arranged in like fashion.

Figure 10:
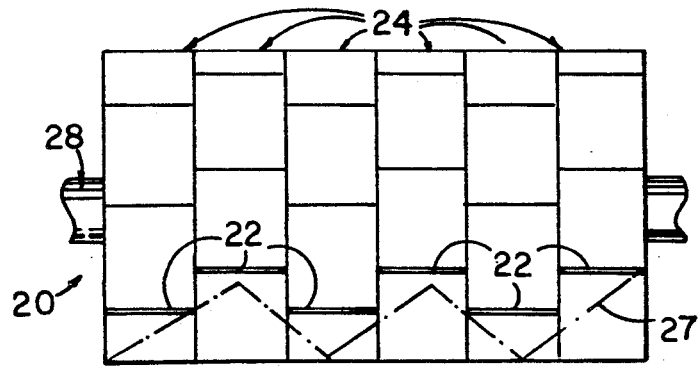
FIG. 10 is a front elevational view of the debarker head of FIG. 1, showing the cutting elements in a fourth alternative arrangement.

A fourth alternative arrangement is illustrated in FIG. 10. In this arrangement, every other cutting element 24 is rotated backward or forward relative to an adjoining cutting element 24, providing a staggered or zig zag array 27 of cutting knives 22.

Such a variety in the arrangement of cutting knives 22 is only possible with cutting elements configured so that the number of arms 32 is not an integer multiple of the number of sides of mounting aperture 34, although less preferably, some of the cutting elements 24 could include an even integer multiple of the sides of aperture 34.

While cutting elements 24 are preferably identical, a bevel 70 may be ground or cut into each arm 28 and each cutting knife 22 of the end most cutting element 24 of the stack of cutting elements, positioned on a side of cutting element 24 which does not abut, but is opposite to, an adjoining cutting element 24. As seen in FIGS. 4 and 5, such bevels 70 may be provided for either or both opposing, end cutting elements 24 of the stack as the particular circumstances, under which the barker head 20 is used, dictate.

The above description is considered that of a preferred embodiment of the present invention. Various modifications of the preferred embodiment of the invention can be made by those who are skilled in the art without departing from the spirit or scope of the invention as defined by the appended claims.

The embodiments of the invention in which an exclusive property or privilege is claimed are defined as follows:

1. A debarker head for use in a tree debarking machine, the head having a number of different assembled arrangements, comprising:
    a drive shaft having a predetermined length and a mounting area extending over at least a portion of said predetermined length, said mounting area comprising a number of sides forming a regular polygonal cross sectional shape;
    a plurality of generally identical cutting elements, each said cutting element having a peripheral edge and a mounting aperture with a regular polygonal cross sectional shape corresponding to said mounting area, each said cutting element and said drive shaft being adapted for slip fit engagement between said mounting area and each said mounting aperture, each said cutting element engaging said mounting area at a number of rotational positions relative to said drive shaft, said number of rotational positions being defined by said number of sides forming said mounting aperture;
    a number of cutting knives disposed at equally spaced intervals about said peripheral edge of each said cutting element; and
    means for mounting said cutting elements on said drive shaft with each of said cutting elements engaging said mounting area at a predetermined one of said number of different rotational positions relative to said drive shaft to define one of the number of different assembled arrangements of the debarker head.

2. The debarker as defined in claim 1 wherein said number of cutting knives of each of said cutting elements is other than an integer multiple of said number of sides forming said mounting aperture.

3. The debarker head as defined in claim 2 wherein said debarker head further includes retaining means for retaining said cutting elements on said drive shaft.

4. The debarker head as defined in claim 3 wherein said drive shaft has first and second opposing ends and said retaining means includes a locking device between said cutting elements and each of said opposing ends of said drive shaft.

5. The debarker head as defined in claim 4 wherein at least one of said locking devices comprises a locking nut and a corresponding threaded portion of said drive shaft for receiving said locking nut.

6. The debarker head as defined in claim 2 wherein said drive shaft has first and second opposing ends and said drive shaft includes a bearing journal between said cutting elements and at least one of said opposing ends.

7. The debarker head as defined in claim 6 wherein said drive shaft includes a bearing journal between said cutting elements and each of said opposing ends.

8. The debarker head as defined in claim 7 wherein said drive shaft further includes a drive sheave adjacent at least one of said opposing ends for receiving a drive gear for rotating said debarker head.

9. The debarker head as defined in claim 2 wherein each said cutting element further includes a number of arms extending generally radially outward from a center body portion, said number of arms corresponding to said number of cutting knives.

10. The debarker head as defined in claim 9 wherein each said arm has a leading face relative to a direction of rotation of said debarker head and said cutting knives are removably attached on said faces.

11. A debarker head for use in a rotary tree debarking machine, the head having a number of different assembled arrangements, comprising:
    a drive shaft having a predetermined length and a mounting area extending over at least a portion of said predetermined length, said mounting area comprising a number of sides forming a regular polygonal cross sectional shape for receiving a plurality of cutting elements; and
    a plurality of substantially identical cutting elements, each said cutting element having a center body portion and a number of arms extending generally radially outward from said body portion to a terminal end, said arms being equally spaced around said body portion, each said cutting element having cutting means at each said terminal end for cutting bark, each said cutting element having a mounting aperture generally centered in said body portion, each said mounting aperture having a number of sides forming said mounting aperture with a regular polygonal cross sectional shape corresponding to said mounting area and being sized for slip fit engagement between said mounting aperture and said mounting area, each said cutting element engaging said drive shaft at a number of rotational positions relative to said drive shaft, said number of rotational positions being defined by said number of sides forming said mounting aperture; and
    means for mounting said cutting elements on said drive shaft in generally adjacent orientation relative to one another with each of said cutting elements engaging said mounting area at a predetermined one of said number of different rotational positions relative to said drive shaft to define one of the number of different assembled debarker head arrangements.

12. The debarker head as defined in claim 11 wherein said number of said arms of each of said cutting elements is other than an integer multiple of said number of sides forming said mounting aperture.

13. The debarker head as defined in claim 12 wherein said debarker head further includes retaining means for retaining said cutting elements on said mounting area.

14. The debarker head as defined in claim 13 wherein said drive shaft has first and second opposing ends and said retaining means includes a locking device between said mounting area and each of said opposing ends of said drive shaft.

15. The debarker head as defined in claim 14 wherein at least one of said locking devices comprises a locking nut and a corresponding threaded portion of said drive shaft adjacent said mounting area for receiving said locking nut.

16. The debarker head as defined in claim 12 wherein said drive shaft has first and second opposing ends and said drive shaft includes a bearing journal between said mounting section and at least one of said opposing ends.

17. The debarker head as defined in claim 16 wherein said drive shaft includes a bearing journal between said mounting area and each of said opposing ends.

18. The debarker head as defined in claim 17 wherein said drive shaft further includes a drive sheave adjacent at least one of said opposing ends for receiving a drive gear for rotating said debarker head.

19. The debarker head as defined in claim 12 wherein each said cutting means comprises a cutting knife.

20. The debarker head as defined in claim 19 wherein each said arm has a leading face relative to a direction of rotation of said debarker head and said cutting knives are removably attached on said faces.

* * * * *

UNITED STATES PATENT AND TRADEMARK OFFICE
CERTIFICATE OF CORRECTION

PATENT NO.  : 5,201,353
DATED       : April 13, 1993
INVENTOR(S) : Theodore C. Weill It is certified that error appears in the above-indentified patent and that said Letters Patent is hereby corrected as shown below:

Column 4, Line 36;

"ounted" should be --mounted--.

Column 5, Claim 1, Line 37;

after "aperture" insert --comprising a number of sides forming said mounting aperture--.

Column 5, Claim 2, Line 57;

after "debarker" insert --head--.

Signed and Sealed this

Ninth Day of May, 1995

Attest:

BRUCE LEHMAN

Attesting Officer     Commissioner of Patents and Trademarks